United States Patent [19]
Yamamoto

[11] Patent Number: 6,042,501
[45] Date of Patent: Mar. 28, 2000

[54] VARIABLE CONTROL DEVICE FOR A CONTINUOUSLY VARIABLE TRANSMISSION

[75] Inventor: Masahiro Yamamoto, Zama, Japan

[73] Assignee: Nissan Motor Co., Ltd., Yokohama, Japan

[21] Appl. No.: 09/145,133

[22] Filed: Sep. 1, 1998

[30] Foreign Application Priority Data

Sep. 1, 1997 [JP] Japan .................................. 9-236372

[51] Int. Cl.⁷ .................................................. F16H 61/00
[52] U.S. Cl. .............................................. 477/48; 701/61
[58] Field of Search .............................. 477/43, 46, 48; 701/58, 61

[56] References Cited

U.S. PATENT DOCUMENTS 4,670,843   6/1987   Matsumura et al. .................. 477/48 X

FOREIGN PATENT DOCUMENTS 10-281271   10/1998   Japan .
10-281272   10/1998   Japan .
11-37277    2/1999    Japan .

*Primary Examiner*—Khoi Q. Ta
*Attorney, Agent, or Firm*—Foley & Lardner

[57] ABSTRACT

A variable control device which controls the rotations of a step motor in a continuously variable transmission and maintains the variable ratio is provided with a feed back control system and a feed forward control system. These control systems are switched on the basis of the driving conditions. The feed back control is provided with an actual pulley compensator 108b which calculates the external disturbance compensation from the actual pulley ratio (Aip) and a command value external disturbance compensator 108a which calculates the external disturbance compensation from the command pulley ratio. When switching from open loop control to feed back control, the actual pulley ratio compensator 108b is initialized to the actual variable ratio (Aip). On the other hand, the command value compensator 108a is initialized to the command pulley ratio ($ip_R$). Hence it is possible to prevent the command pulley ratio from varying greatly immediately after switching and control the generation of variable shocks when transferring from open loop control to feed back control.

8 Claims, 8 Drawing Sheets of the type
$$\frac{1}{1+\frac{T}{Ts}\frac{1-Z^{-1}}{Z^{-1}}}$$

Unit Delay : Initialization is set to this value of the type
$$\frac{1+\frac{T_2}{Ts}\frac{1-Z^{-1}}{Z^{-1}}}{1+\frac{T_1}{Ts}\frac{1-Z^{-1}}{Z^{-1}}}$$

Unit Delay : Initialization is set to this value of the type $Z^{-n}$

Unit Delay : All initialization are set to these values

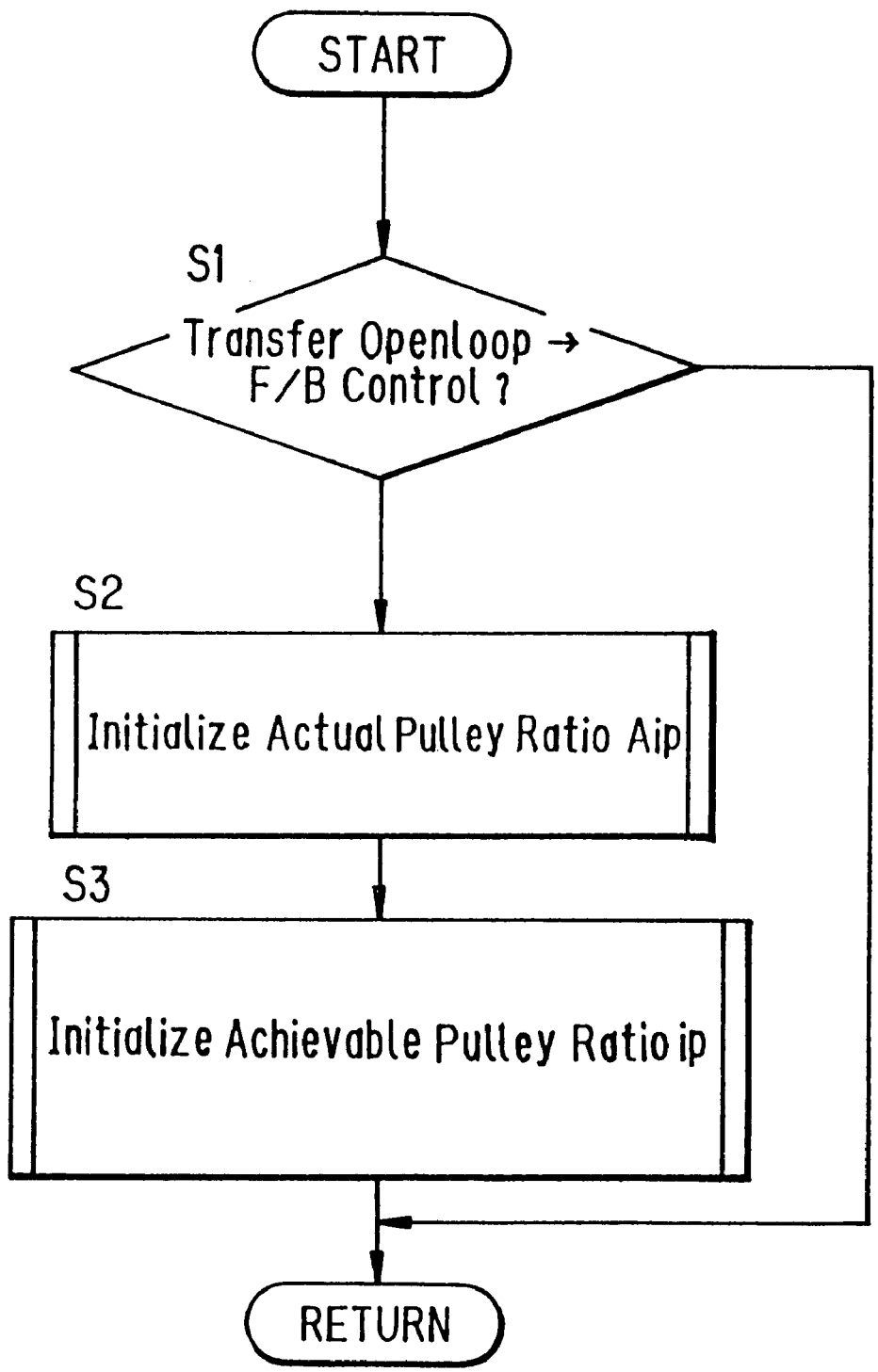

VARIABLE CONTROL DEVICE FOR A CONTINUOUSLY VARIABLE TRANSMISSION

FIELD OF THE INVENTION

The present invention relates to a variable control device for a continuously variable transmission used in a vehicle or the like.

BACKGROUND OF THE INVENTION

V-belt or toroidal continuously variable transmissions are known in the prior art as continuously variable transmissions used in vehicles. Variable control valves are driven by actuators such as step motors and the variable ratio is continuously varied on the basis of oil pressure.

It is not possible to correctly perform feed back control in this kind of variable control device when the oil temperature of the working oil is extremely low because the viscosity of the working oil increases and the response characteristics of the control valves are greatly reduced or when the actual pulley ratio i.e. the variable ratio, can not be detected due to extremely low speed running. In this event, open loop control exhibits greater accuracy. Hence JPA-9-199524 filed by the present applicant shows the use of open loop control at times of low speed running or low temperatures, such use reverting to feed back control when conditions return to normal.

JP-A-9-329229, JP-A-9-89494 and JP-A-9-89496, filed by the present applicant, are examples of devices provided with an external disturbance compensator to improve normal response characteristics and control external disturbances to the variable mechanism, the influence of age softening and lags in the response time of the step motor.

However convention variable control devices for a continuously variable transmissions initialize the external disturbance compensator of the control device and the like to the actual pulley ratio (Aip) which equals the actual variable ratio, when the transition is made from open loop control to feed back control. In other words, when feed back control is commenced, adjustment is made so that the deviation of the command pulley ratio ($ip_R$) from the actual pulley ratio (Aip) is equal to 0.

However at this time, it is not certain that the command pulley ratio ($ip_R$), that is to say the feed back command value, and the actual pulley ratio (Aip) will agree. For example, if the variable ratio is undergoing extreme variation, the deviation easily increases. When there is a large deviation, the command pulley ratio ($ip_R$) will rapidly change on initialization from the value during open loop control. Furthermore if the command value during open loop control is in agreement with the value during feed back control, no rapid change will occur in the command value when switching.

When the command pulley ratio ($ip_R$) rapidly changes, the actuator controlling the variable ratio operates rapidly and there is the possibility that a shock will be generated due to the large variation in th e variable ratio.

SUMMARY OF THE INVENTION

The object of the present invention is to suppress the generation of variable shocks associated with transferring from open loop control to feed back control.

In order to achieve the above object, the variable control device of a continuously variable transmission of the present invention is provided with a target variable ratio setting circuit which sets the target variable ratio in response to the driving conditions of the vehicle, a feed back compensation calculation circuit which calculates the feed back command value so that the actual variable ratio follows the target variable ratio, a control switch circuit which switches open loop control in response to the target variable ratio and feed back control in response to the feed back command value based on the driving conditions.

The feed back compensator calculating circuit is initialized when said control switching circuit switching from open loop control to feed back control so as to maintain the deviation of the actual variable ratio and the feed back command value immediately before the control switching.

The details as well as other features and advantages of the invention are set forth in the remainder of the specification and shown in the accompanying drawings.

SIMPLE EXPLANATION OF THE DRAWINGS

Figure 6A:
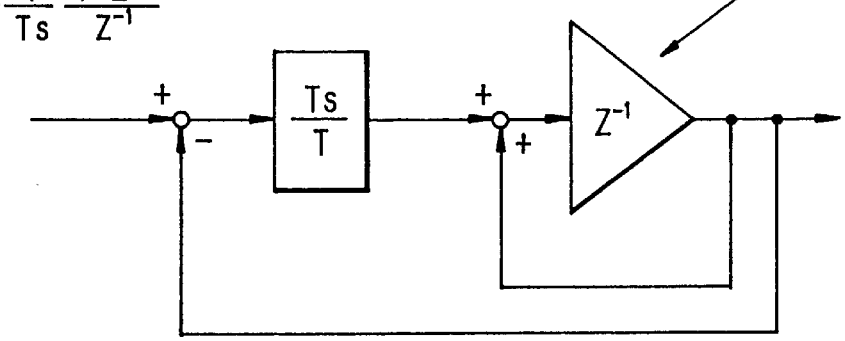
Figure 6B:
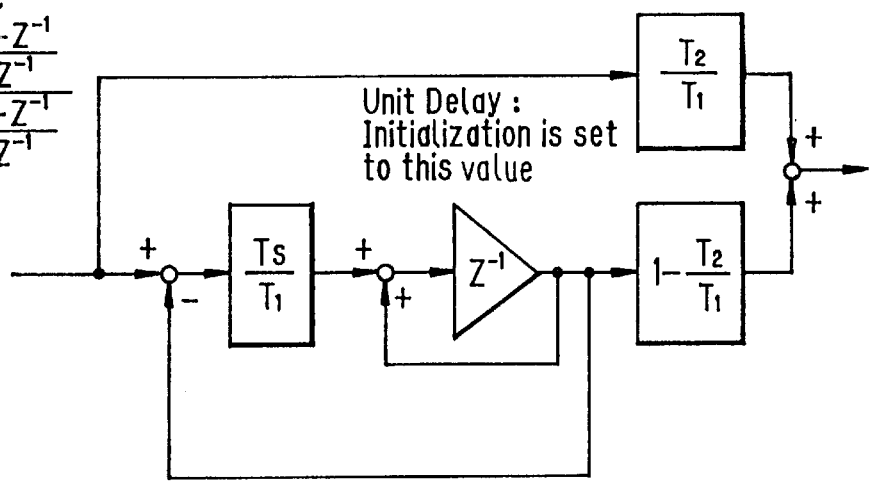
Figure 6C:
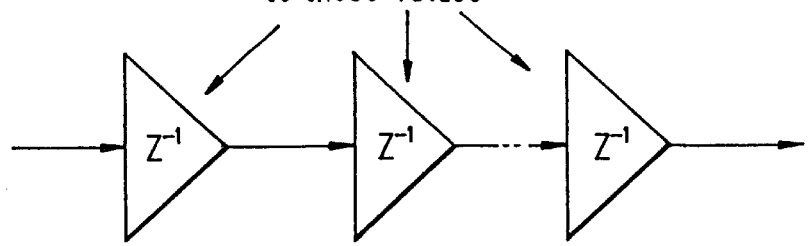

FIGS. 6(A)–6(C) are similar figures showing each control element, wherein 6(A) shows the command value side of the compensator, 6(B) shows the compensator on the actual pulley ratio side and the feed forward compensator, and 6(C) shows the delay block.

FIG. 7 is a flowchart which shows an example of the control switch initialization process performed in the CVT control unit.

Figure 8:
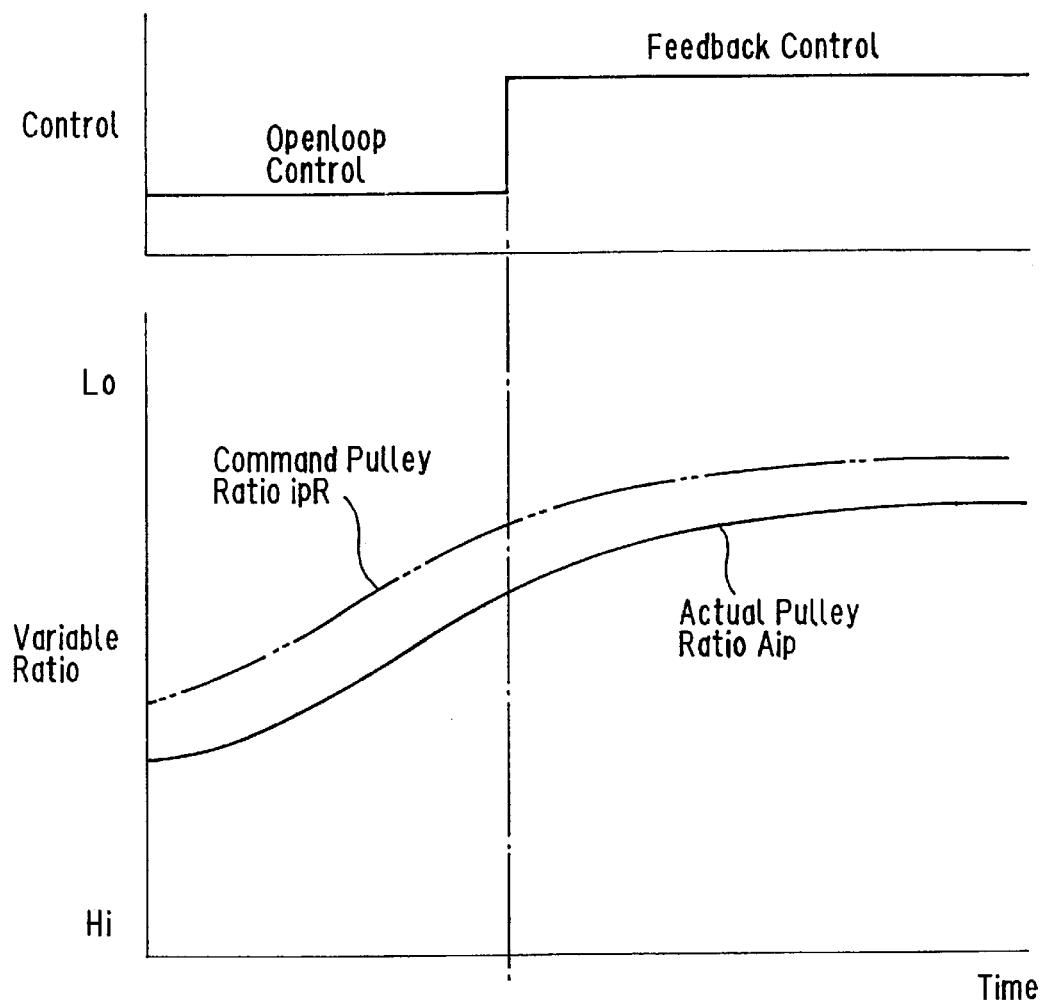

FIG. 8 is a graph which shows the relationship of the actual pulley ratio and the command pulley ratio to time.

PREFERRED EMBODIMENTS OF THE INVENTION

The preferred embodiments of the invention will be explained below with reference to the accompanying drawings.

Figure 1:
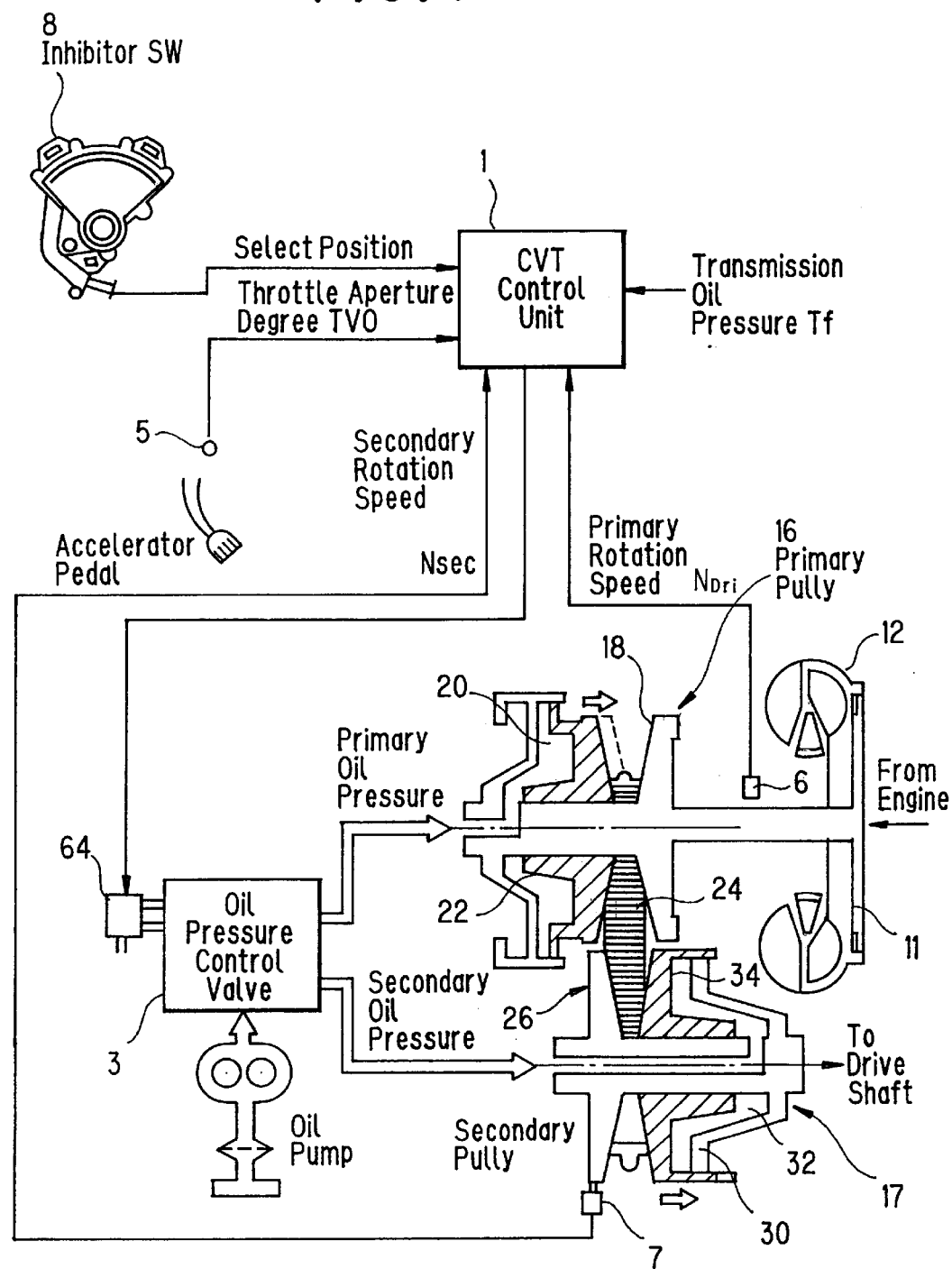
FIG. 1 is a schematic diagram of a V-belt continuously variable transmission showing an embodiment of the present invention.

FIG. 1 shows a continuously variable transmission 17 which is provided with a primary pulley 16 connected to the engine (not shown) and a secondary pulley 26 connected to the drive shaft which act as a pair of variable pulleys. This pair of variable pulleys is connected by a V-belt 24.

The drive ratio of the continuously variable transmission 17 (hereafter pulley ratio) is controlled by an oil pressure control device 3. In order to control the oil pressure, a step motor 64 or the like is provided as an actuator which drives the variable control valve 63 in response to the target pulley ratio from the CVT control unit 1 as shown in FIG. 1 and the line pressure control valve (not shown) which adjusts the line pressure.

The CVT control unit 1 reads the signals from the primary pulley rotation speed sensor 6 which detects the rotation speed (Npri) of the primary pulley 16 of the continuously variable transmission 17, the signal from the secondary pulley rotation speed sensor 7 which detects the rotation speed (Nsec) of the secondary pulley 26, the select position and the variable mode (Mode) from the inhibitor switch 8, and the degree of throttle aperture (TVO) (hereafter degree of accelerator depression) from the throttle aperture sensor 5 in response to the degree of depression of the accelerator pedal operated by the driver. Furthermore the vehicle speed (VSP) and oil temperature (Tf) of the continuously variable transmission 17 from the temperature sensor (not shown) are read. The target pulley ratio (ip) is variably controlled in response to the driving conditions of the vehicle or the demands of the driver. (Below this will be termed the achievable pulley ratio, however the value represents the ultimate target value of the pulley ratio in transferring from the current pulley ratio. In other words it represents the target variable ratio.)

In the present embodiment, vehicle speed VSP is read as a multiple of a fixed number with respect to the secondary rotation speed (Nsec).

A torque converter 12, which is provided with a lock up clutch 11, is interposed between the V-belt continuously variable transmission 17 and the engine (not shown). The output of the torque converter 12 is transmitted to the primary pulley 16 which acts as a input shaft.

The primary pulley 16 is formed as a unit with a rotating fixed conical plate 18 and a variable conical plate 22 which is disposed facing the fixed conical plate 18, forms the V shaped pulley groove and displaces in the axial direction due to the oil pressure (primary pulley oil pressure) moving towards the primary pulley cylinder chamber 20.

The secondary pulley 26 is connected to the drive shaft and is comprised of a rotating fixed conical plate 30 and a variable conical plate 34 which is disposed facing the fixed conical plate 30, forms the V shaped pulley groove and displaces in the axial direction due to the oil pressure (line pressure) moving towards the secondary pulley cylinder chamber 32. These two are formed as a unit on the same axis as the secondary pulley 26.

The pulley ratio of the primary and secondary pulley s 16, 26, that is to say the pulley ratio (ip) varies in response to the variation in the radius of contact with the V belt 24 as a result of the displacement of the variable conical plate 34 of the secondary pulley 26 and the variable conical plate 22 of the primary pulley 16 in the axial direction.

For example if the width of the V shaped pulley groove of the primary pulley 16 decreases, the contact radius of the V belt 24 on the secondary pulley 26 side decreases and it is possible to reduce the pulley ratio (the variable ratio on the High side). If the variable conical plate 22 displaced in the opposite direction, the pulley ratio (the variable ratio on the Low side) will increase.

Figure 2:
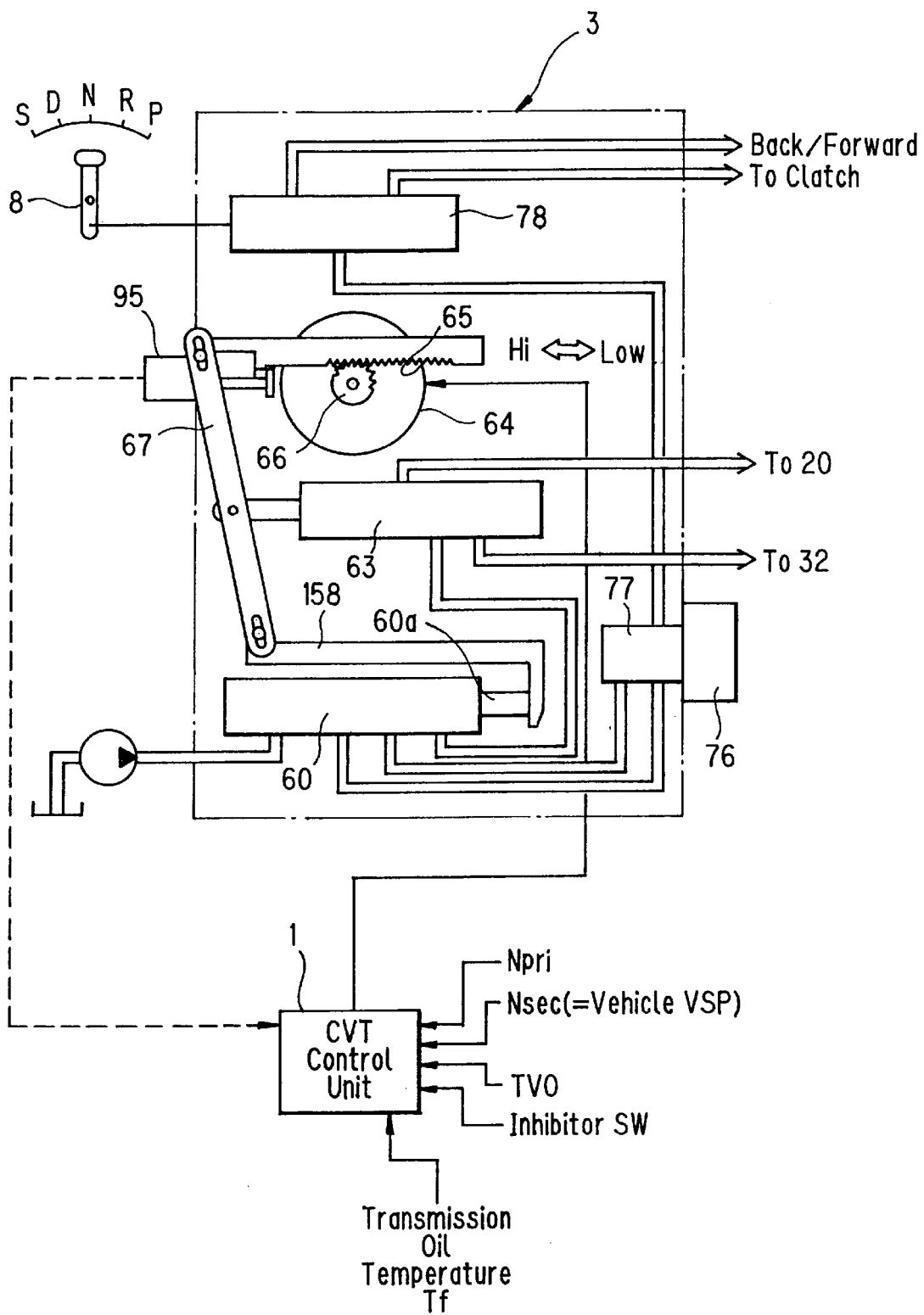
FIG. 2 is a schematic diagram of an oil pressure control device showing an embodiment of the present invention.
Figure 3:
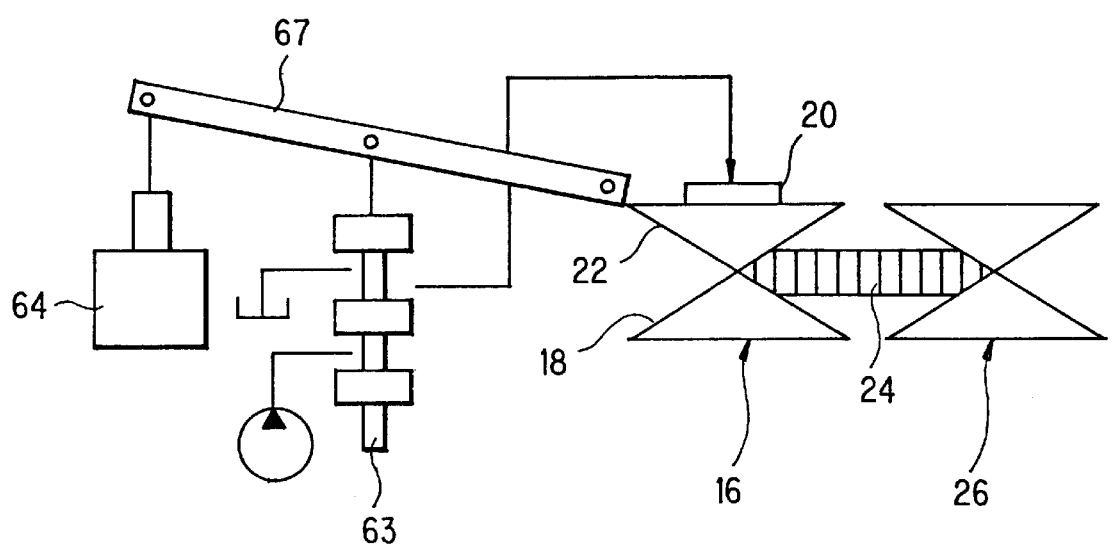
FIG. 3 shows the main components of a V-belt continuously variable transmission using an embodiment of the present invention.

In such a way, variable control which varies the width of the V shaped pulley groove of the primary pulley 16 and the secondary pulley 26 is performed by the control of oil pressure towards the primary pulley cylinder chamber 20. As shown in FIGS. 2 and 3, control is performed by a step motor 64 which drives the variable control valve 63 of the oil pressure control device 3.

The step motor 64 drives the variable control valve 63 in response to commands from the CVT control unit 1 through the variable link 67. By adjusting the oil pressure supplied to the cylinder chamber 20 of the primary pulley 16, the step motor 64 controls the actual pulley ratio (Aip), that is to say, the actual variable ratio so that it agrees with the achievable pulley ratio (ip).

The mechanism for controlling oil pressure feedback is the same as that in the conventional device above. The step motor 64 is engages with the rack 65 in a meshing fashion through the pinion 66. The rack 65 is connected to one end of the variable link 67 of the fixed lever ratio. The spool of the variable control valve 63 is connected along the variable link 67. A feed back member 158 which displaces in the axial direction of the variable conical plate 22 which comprises the primary pulley 16 is connected to the other end of the link 67.

One end of the feed back member 158 is connected in the axial direction to the outside periphery of the variable conical plate 22 and is connected to the rod 60a of the line pressure control valve 60 at determined points. The variable control valve 63 and the line pressure control valve 60 are driven by the oscillation of the variable link 67 in response to the displacement of the step motor 64 and the relative displacement of the feed back member 158.

The variable control valve 63 controls the supply of oil pressure to the cylinder chamber 20 of the primary pulley 16 in response to the displacement of the variable link 67 as a result of the impelling level of the step motor 64. The line pressure is normally supplied to the cylinder chamber 32 of the secondary pulley 26 from the line pressure valve 60.

Therefore when the actual pulley ratio (Aip) agrees with the achievable pulley ratio (ip) based on the displacement of the step motor 64, a fixed achievable pulley ratio (ip) is maintained as the variable link 67 connected to the variable conical plate 22 displaces the spool of the variable control valve 63 and maintains the oil pressure of the cylinder chamber 20.

In FIG. 2, reference numeral 78 denotes a manual valve displacing in response to the shift lever, 76 is a negative pressure diaphragm, 77 is a throttle valve displacing in response to negative pressure diaphragm 76, 95 is a Low switch which is placed in the ON position by the displacement of the rack 65 to the minimum Low pulley ratio (minimum Low variable ratio).

Next the variable control performed by the CVT control unit will be explained with reference to FIGS. 4 and 5.

From a map (not shown), the achievable pulley ratio calculation part 100 searches for the achievable pulley ratio (ip) based on driving conditions such as the vehicle speed (VSP) and the degree of throttle aperture (TVO). The actual pulley ratio calculation part 101 computes the actual pulley ratio (Aip) from the rotation speed (Npri) of the primary pulley 16 and the rotation speed (N sec) of the secondary pulley 26.

After the achievable pulley ratio (ip) is smoothed out on the basis of driving conditions such as the degree of throttle aperture (TVO) at the filter 102, the result is inputted into the feed forward (F/F) compensator 103.

The feed forward (F/F) compensator 103 calculates the target pulley ratio ($ip_T$) which can follow the achievable pulley ratio (ip) at a time constant (Tt) from the present actual pulley ratio (Aip) on the basis of the time constant (Tt) set by the target time constant calculation part 104 based on the actual pulley ratio (Aip).

Next the feed forward back (F/B) compensator 103 searches for the time constant (Tp) which the control object model 106 of the variable mechanism and the step motor 64 calculate on the basis of the actual pulley ratio (Aip), and the command pulley ratio ($ip_R$), i.e. the feedback command value, considering the motion characteristics of the control object model 106 based on the deviation of the target pulley ratio ($ip_T$) and the actual pulley ratio (Aip). The command pulley ratio ($ip_R$) is input into the command value limiter 107.

Figure 5:
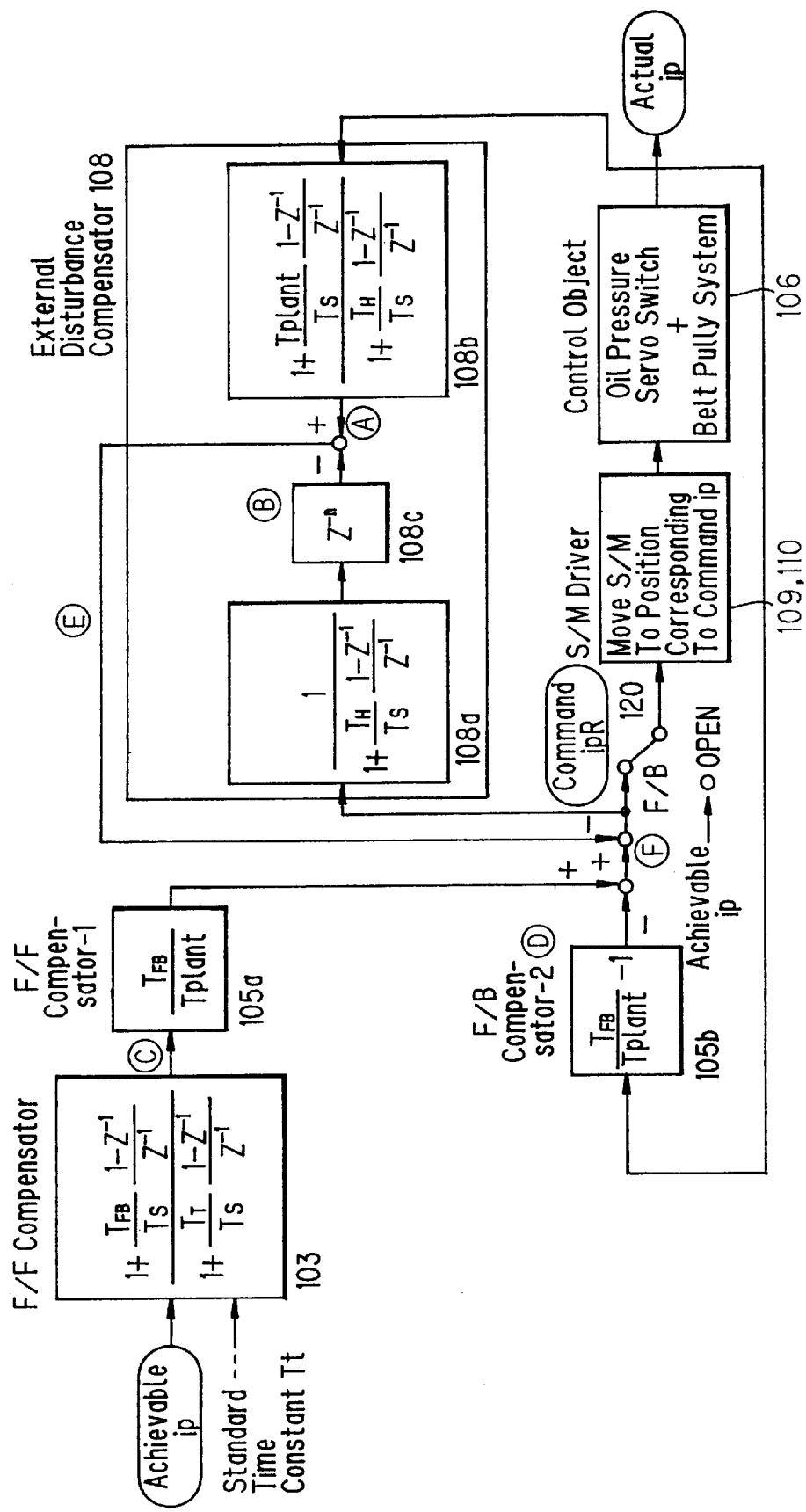
FIG. 5 is a similar block diagram showing the control of the feed back in the compensation system.

After the external disturbance compensation amount from the external disturbance compensator 108 as shown in FIG. 5 is input into the command value limiter 107 and the command pulley ratio (ip$_R$) is adjusted on the basis of the external disturbance compensation amount, the result is input into the step command part 109 and is converted to the target position (DsrSTP) of the step motor 64 corresponding to the command pulley ratio (ip$_R$) based on the characteristics of the predetermined map. The target position (DsrSTP) corresponds to the degree of target displacement of the rack 65 as shown in FIG. 2.

The target position (DsrSTP) is set in the step motor motive part 110 as a step number (STP) and motive speed (PPS) i.e. pulse rate corresponding to the oil temperature (Tf) of the continuously variable transmission and is output to the step motor 64 in order to control the present pulley ratio.

Therefore the target pulley ratio (ip$_T$) on which the current actual pulley ratio (Aip) can follow is searched for corresponding to the time constant (Tt) set from conditions such as driving conditions and on the basis of the achievable pulley ratio (ip) calculated from the driving conditions. Feed back compensation is applied into the target pulley ratio (ip$_T$), the command pulley ratio (ip$_R$) is calculated, and the step number of the step motor 64 and the motive speed (PPS) are calculated from the two above values to which external disturbance has been added.

As shown in FIG. 5, the external disturbance compensator is comprised of a command value compensator 108a (first signal processing part) which performs external disturbance compensation based on the command pulley ratio (ip$_R$), a delay block 108c which delays the output of the command value compensator 108a, and an actual pulley ratio compensator 108b (second signal processing part) which performs external disturbance compensation based on the actual pulley ratio (Aip).

The external disturbance compensator 108 is provided with an inverse characteristic control object model 106 and calculates the time constant (Tt) corresponding to the control object fixed time (Tp) of the control object model 106. The external disturbance compensator 108 performs external disturbance compensation calculations after compensating for the fixed time (T$_H$) corresponding to the variable direction (upshift or downshift). This function is the same as motion characteristic compensation control containing external disturbance compensation disclosed by the present applicant in JP-A-9-89494 and JP-A-9-89496.

Figure 4:
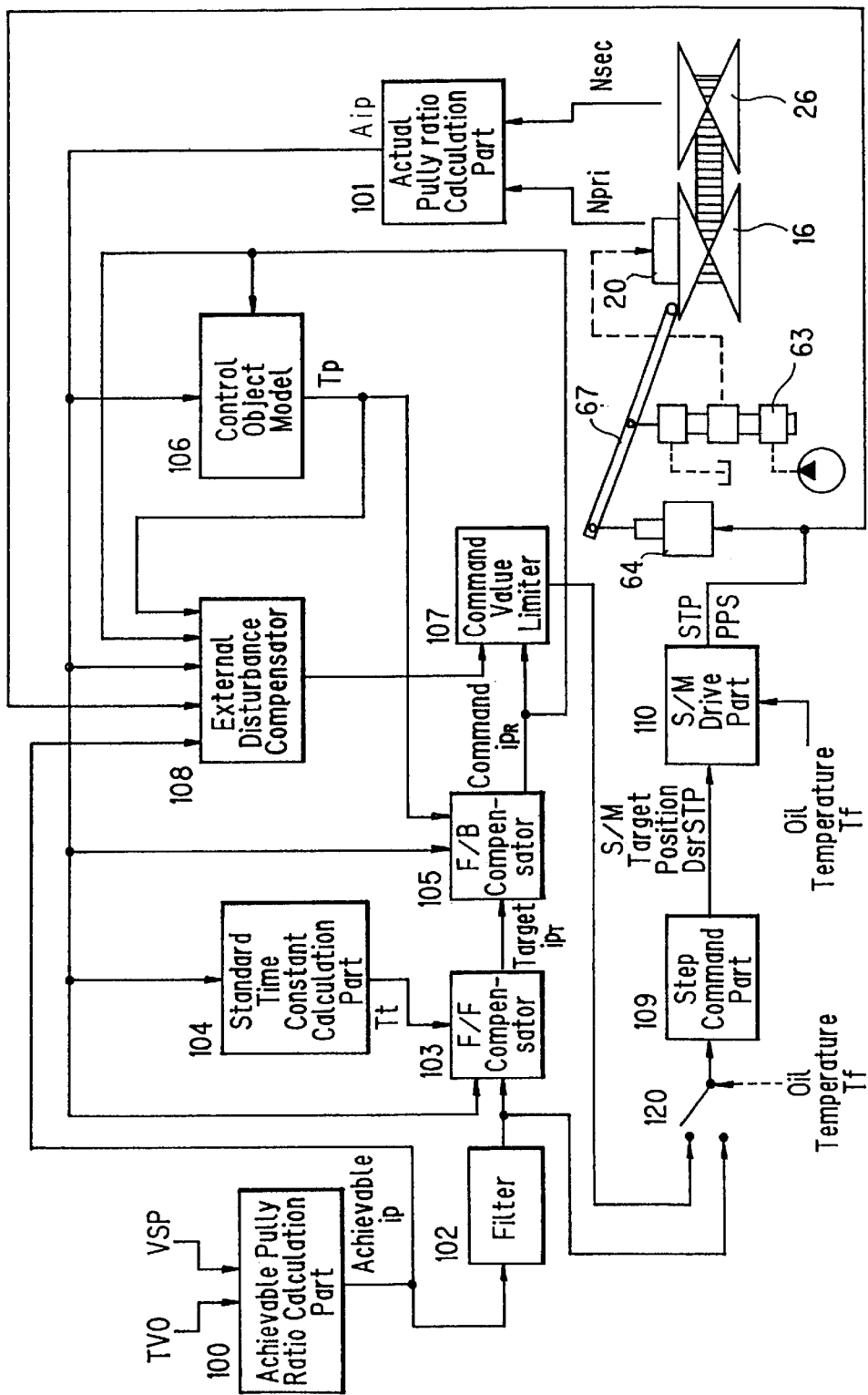
FIG. 4 is block diagram showing the control of the CVT control unit.

The degree of external disturbance compensation calculated by the external disturbance compensator 108 is output to the command value limiter 107 in FIG. 4.

The command pulley ratio (ip$_R$) to which external disturbance compensation is applied in the command value limiter 107, is input into the step command part 109 from the control switching part 120 and ratio is switched to the target position (DsrSTP) of the step motor 64.

The control switching part 120 for example performs open-loop control in a similar way to the conventional device above when the oil temperature (Tf) of the continuously variable transmission 17 or the vehicle speed does not reach a fixed value. As a result if the achievable pulley ratio (ip) is selected and is output to the step command part 109, the step motor 64 will undergo open-loop control. Once a determined feed back condition is established, the command value limiter 107 is selected, the value is output to the step command part 109 and the step motor 64 undergoes feed back control.

After the step command part 109 converts the command pulley ratio (ip$_R$) or the achievable pulley ratio (ip) to the step number (step) based on the map not shown in the figure, the hysteresis corresponding to the variable direction is set and the target position (DsrSTP) is output.

Based on the target position (DsrSTP), the step motor motive part 110 outputs the command step number (STP) to the step motor 64 at a motive speed (PPS) which corresponds to the oil temperature (Tf). When the frictional force of the oil increases with its decreasing temperature, a large motive force is necessary, the corresponding speed is set low and the motor torque increases.

The output command step number (STP) is calculated by subtracting the actual step number from the target position (DsrSTP).

The motive speed (PPS) is set corresponding to the oil temperature (Tf) of the continuously variable transmission 17 based on the predetermined map or the like. In other words when the oil temperature (Tf) is low, the motive speed (PPS) is set low and the motive force of the step motor 64 is maintained. On the other hand, when the oil temperature (Tf) is high, the motive speed (PPS) is set high and the response is raised. After the determined motive speed (PPS) is limited to within the maximum motive speed range corresponding to the motive characteristics of the step motor 64, the calculated command step number (STP) is output to the step motor 64 at a motive speed (PPS).

The feed back system is illustrated in FIGS. 5 and 6.

In FIG. 5, the feed back compensator 105 is comprised of the feed forward compensator part 105a on the achievable pulley ratio (ip) side and the feed back compensator part 105b on the actual pulley ratio (Aip) side. In FIG. 5, the S/M driver corresponds to the step command part 109 and the step motor motive part 110 above. In FIG. 5, each symbol is defined as set out below.

T$_{F/B}$: Fixed Time for Feed Back
Tplant: Fixed Time for Control Object Model
T$_H$: Fixed Time Compensation Characteristic for External Disturbance Compensator
T$_S$: Sample Period
$Z^{-1}$: One Cycle Delay
$Z^{-n}$: Delay Corresponding to Continuous Time of the Control Object Each control element such as the feed foward compensator 103, the feed back compensator 105 and the external disturbance compensator 108 are divided into those elements which process signals with respect to command pulley ratio (ip$_R$) and those elements which process signals with respect to the actual pulley ratio (Aip). The command value compensator 108a and the delay block 108c process signals with respect to command pulley ratio (ip$_R$). The actual pulley ratio compensator 108b processes signals with respect to the actual pulley ratio (Aip).

When the control switch part 120 changes from open loop control to feed back control, it is necessary to perform initialization of each control element. This initialization is performed according to the flowchart in FIG. 7.

Firstly the switch from open loop control to feed back control is detected in a Step 1. In a Step 2, the actual pulley ratio compensator 108b which performs signal processing with respect to the actual pulley ratio (Aip) is initialized at the actual pulley ratio (Aip) of the control switch point. Also the feed foward compensator 103 is initialized at the actual pulley ratio (Aip).

Then in a Step 3, the command compensator 108a and the delay block 108c which perform signal processing with respect to the achievable pulley ratio ip are initialized and the initialization process is completed.

The schematic diagram of the control elements such as the external disturbance compensator 108 and the feed forward back compensator 103 are divided into FIG. 6 (A)–(C). Initialization is performed on the delay block $Z^{-1}$ of each control element and set to the set initialization value.

This corresponds to the command value compensator 108a in FIG. 6(A), the actual pulley ratio compensator 108b in FIG. 6(B) and the delay block 108c in FIG. 6(C).

During open loop control, if the achievable pulley ratio= 2.0 and the actual pulley ratio=2.3, and the transition is made from open loop control to feed back control and initialization is performed as above, each output, that is to say, the pulley ratios A–F shown in FIG. 5 are initialized as shown below.

The actual pulley ratio compensator 108b is initialized on the basis of an actual pulley ratio of 2.3, the external disturbance compensator delay block 108c is initialized on the basis of an achievable pulley ratio of 2.0, and the feed forward compensator is initialized on the basis of an actual pulley ratio of 2.3. As a result, the output of all components is shown as below.

A; Actual Pulley Ratio Compensator 108b Output Pulley Ratio=2.3

B; External Disturbance Compensator Delay Block 108c Output Pulley Ratio=2.0

C; Feed Forward Compensator Output Pulley Ratio=2.3 (Target Pulley Ratio $Ip_T$)

D; Feed Back Compensator 105 Ouput Pulley Ratio=2.3

As a result the limiter output value which represents the addition of output of the external disturbance compensator, which is the deviation of (A) and (B), and the feed back value is set out as below.

E; External Disturbance Compensator Output Pulley Ratio Deviance=+0.3

F; Command Value Limiter Output Pulley Ratio=2.0 (command pulley ratio $ip_R$)

Hence the command pulley ratio which corresponds to the feed back command value becomes 2.0. This value is the same as the achievable pulley ratio during open loop control immediately before initialization.

Hence as shown in FIG. 8, even if there is a switch from open loop control to feed back control, it is possible to maintain the command pulley ratio ($ip_R$) at 2.0: the value immediately prior to switching. The deviation of the command pulley ratio ($ip_R$) and the actual pulley ratio (Aip) is maintained at the deviation before the control switch. Hence it is possible to avoid rapid fluctuations in the command value unlike the conventional device around the switch from open loop control to feed back control. This enables the prevention of excessive changes in the present pulley ratio which result from the rapid change in the command value and the prevention of variable shock during control switching.

Hence by feed back control, the achievable value is modified to correspond to the deviation which existed between the command pulley ratio and the actual pulley ratio during open loop control. The actual pulley ratio varies in response to this, but modifying the command value in this way is not performed in the rapid way as in initialization during control switching. In other words the modification of the command value is performed in the range of the responses during normal feed back actual. Hence the control pulley ratio does not generate variable shocks and varies at a suitable response speed.

The present invention is not limited to the embodiments described in the specification and obviously extends to modifications by the person skilled in the art within the scope of the claims.

What is claimed:

1. A variable control device for a continuously variable transmission comprising:

an achievable pulley ratio setting circuit which sets an achievable pulley ratio in response to driving conditions of a vehicle;

an actual pulley ratio calculating part which computes an actual pulley ratio from a rotation speed of a primary pulley and a rotation speed of a secondary pulley;

a compensator calculating circuit which calculates a feed back command value, according to a deviation based on the achievable pulley ratio and the actual pulley ratio during feed back control, so that the actual pulley ratio follows the achievable pulley ratio; and a control switching circuit which switches to open loop control which utilizes the achievable pulley ratio and to feed back control which utilizes the feed back command value, wherein the compensator calculating circuit is initialized when the control switching circuit switches from open loop control to feed back control, so as to maintain the deviation which exists when the control is switched.

2. A variable control device according to claim 1, wherein the compensator calculating circuit comprises an external disturbance compensator having a first signal processing part which performs signal processing with respect to the feed back command value and a second signal processing part which performs signal processing with respect to the actual pulley ratio, and when the control switching circuit switches from open loop control to feed back control, the first signal processing part is initialized to the achievable pulley ratio which exists immediately before the control switching and the second signal processing part is initialized to the actual pulley ratio which exists immediately before the control switching.

3. A variable control device according to claim 2, wherein the compensator calculating circuit further comprises a feed forward compensator which calculates a target pulley ratio based in part on the achievable pulley ratio, and when the control switching circuit switches from open loop control to feed back control the feed forward compensator is initialized to the actual pulley ratio which exists immediately before the control switching.

4. A variable control device according to claim 3, wherein the compensator calculating circuit further comprises a feed back compensator which calculates a command pulley ratio based in part on the target pulley ratio and the actual pulley ratio.

5. A method of controlling a continuously variable transmission during a transition from open loop control to closed loop control, the method comprising:

setting an achievable pulley ratio in response to driving conditions of a vehicle;

computing an actual pulley ratio from a rotation speed of a primary pulley and a rotation speed of a secondary pulley;

calculating a feed back command value with a compensator calculating circuit, according to a deviation based on the achievable pulley ratio and the actual pulley ratio during feed back control, so that the actual variable ratio follows the achievable pulley ratio;

switching from open loop control to feed back control in response to an input related to the vehicle; and initializing the compensator calculating circuit when the switching from open loop control to feed back control occurs, so as to maintain immediately after the switching the deviation that exists just prior to the switching.

6. A method of controlling a continuously variable transmission according to claim 5, wherein the compensator calculating circuit comprises an external disturbance compensator having a first signal processing part which performs signal processing with respect to the feed back command value and a second signal processing part which performs signal processing with respect to the actual pulley ratio, and initializing the compensator calculating circuit when the switching from open loop control to feed back control occurs comprises initializing the first signal processing part to the achievable pulley ratio which exists immediately before the switching and initializing the second signal processing part to the actual pulley ratio which exists immediately before the switching.

7. A method of controlling a continuously variable transmission according to claim 6, wherein the compensator calculating circuit further comprises a feed forward compensator which calculates a target pulley ratio based in part on the achievable pulley ratio, and a feed back compensator which calculates a command pulley ratio based in part on the target pulley ratio and the actual pulley ratio, and initializing the compensator calculating circuit when the switching from open loop control to feed back control occurs further comprises initializing the feed forward compensator to the actual pulley ratio.

8. A method of controlling a continuously variable transmission according to claim 5, wherein the input related to the vehicle, in response to which control is switched from open loop control to feed back control, comprises an oil temperature.

* * * * *